US008038029B2

(12) United States Patent
Lindner et al.

(10) Patent No.: US 8,038,029 B2
(45) Date of Patent: Oct. 18, 2011

(54) ACTIVATION OF A PRESSURE RELIEF DEVICE

(75) Inventors: Markus Lindner, Mainz (DE);
Wolfgang Oelerich, Wiesbaden (DE);
Michael Herrmann, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 566 days.

(21) Appl. No.: 12/138,544

(22) Filed: Jun. 13, 2008

(65) Prior Publication Data
US 2009/0308874 A1    Dec. 17, 2009

(51) Int. Cl.
*F17C 1/06* (2006.01)

(52) U.S. Cl. ...................................... 220/588

(58) Field of Classification Search ............. 220/589,
220/588, 586, 590, 62.22, 62.19, 581, 203.29,
220/203.28, 202, 675, 669, 592.26, 592.01,
220/660; 206/0.6; F17C 1/06, 1/04, 1/02,
F17C 1/00
See application file for complete search history.

(56) References Cited

U.S. PATENT DOCUMENTS

| | | | | |
|---|---|---|---|---|
| 123,269 A * | 1/1872 | Lesson | | 220/567.3 |
| 2,995,011 A * | 8/1961 | Kimmel | | 60/255 |
| 3,062,507 A * | 11/1962 | Andrus | | 165/185 |
| 3,133,422 A * | 5/1964 | Paivanas et al. | | 62/48.3 |
| 3,282,757 A * | 11/1966 | Brussee | | 156/69 |
| 3,321,101 A * | 5/1967 | Griffith | | 220/590 |
| 3,512,675 A * | 5/1970 | Pennell | | 220/586 |
| 3,785,040 A * | 1/1974 | Pechacek | | 29/447 |
| 3,969,563 A * | 7/1976 | Hollis, Sr. | | 428/175 |
| 4,581,285 A * | 4/1986 | Mahefkey, Jr. | | 442/378 |
| 4,699,288 A * | 10/1987 | Mohan | | 220/590 |
| 6,742,554 B1 | 6/2004 | Immel | | |
| 2004/0040969 A1* | 3/2004 | DeLay et al. | | 220/586 |
| 2006/0289546 A1* | 12/2006 | Carter | | 220/565 |
| 2008/0066805 A1 | 3/2008 | Winter et al. | | |
| 2010/0126887 A1* | 5/2010 | Kaddour et al. | | 206/216 |

FOREIGN PATENT DOCUMENTS

| | | |
|---|---|---|
| CN | 1252411 C | 5/2003 |
| CN | 2648254 Y | 10/2004 |
| EP | 1239202 A2 | 9/2002 |

* cited by examiner

*Primary Examiner* — Mickey Yu
*Assistant Examiner* — Robert J Hicks
(74) *Attorney, Agent, or Firm* — Fraser Clemens Martin & Miller LLC; J. Douglas Miller

(57) ABSTRACT

A pressure vessel for storage of a pressurized fluid is provided. The pressure vessel includes a composite layer having an outer surface and an inner surface. The inner surface defines an internal cavity. The pressure vessel further includes at least one pressure relief device in fluid communication with the internal cavity. At least one thermally conductive element is continuously wound on the outer surface of the composite layer and adapted to carry load and transport heat from a heat source adjacent the composite layer to the at least one pressure relief device. A method for producing the pressure vessel is also provided.

16 Claims, 2 Drawing Sheets

US 8,038,029 B2

ACTIVATION OF A PRESSURE RELIEF DEVICE

FIELD OF THE INVENTION

The present disclosure relates to a storage vessel and, more particularly, to a high pressure vessel for a fuel cell system.

BACKGROUND OF THE INVENTION

A fuel cell system has been proposed as a clean, efficient and environmentally responsible power source for electric vehicles and various other applications. One type of fuel cell system employs a proton exchange membrane (PEM) to catalytically react a hydrogen fuel and an oxidant to generate electricity. Typically, the fuel cell system has more than one fuel cell including an anode and a cathode with the PEM therebetween. The anode receives hydrogen gas and the cathode receives oxygen, typically from air. The hydrogen gas is ionized in the anode to generate free hydrogen ions and electrons. The hydrogen ions pass through the PEM to the cathode. The hydrogen ions react with the oxygen and the electrons in the cathode to generate water. The electrons from the anode cannot pass through the PEM, and are instead directed through an electric load, such as a vehicle, to perform work before being sent to the cathode. Many fuels cells may be combined in a fuel cell stack within the fuel cell system to generate a desired quantity of power.

The fuel cell power system can include a reformer or processor that converts a liquid fuel, such as alcohols (e.g., methanol or ethanol), hydrocarbons (e.g., gasoline), and/or mixtures thereof, such as blends of ethanol/methanol and gasoline, to the hydrogen gas for the fuel cell stack. More typically, the hydrogen gas employed as a fuel in the fuel cell system is processed separately from the vehicle and stored. The hydrogen gas is transferred to a high pressure vessel or container on the vehicle to supply the desired hydrogen gas to the onboard fuel cell stack as needed.

High pressure vessels are typically classified into one of four types: a Type I vessel having an all-metal construction; a Type II having a metal-lined construction with a fiber hoop wrap for reinforcement; a Type III having a metal-lined construction with a complete fiber reinforcement wrap; and a Type IV having a plastic-lined construction with a complete fiber reinforcement wrap. As disclosed by Immel in U.S. Pat. No. 6,742,554, hereby incorporated herein by reference in its entirety, the Type IV pressure vessel contemplated in the industry for storage of hydrogen gas is generally cylindrical in shape to provide the desired integrity, and includes an outer structural wall and an inner liner defining a container chamber therein. A Type V vessel having a liner-less composite construction has also been contemplated in the art.

High pressure vessels containing a compressed hydrogen gas must have a desired mechanical stability and integrity that militates against a rupture or bursting of the pressure vessel from the internal pressure. It is also typically desirable to make the pressure vessels on vehicles lightweight so as not to significantly affect the weight requirements of the vehicle. The current trend in the industry is to employ the Type IV pressure vessel for storing the compressed hydrogen gas on the vehicle.

Known high pressure vessels include at least one thermally activated safety valve or pressure relief device (PRD). The PRD is located at a boss at an end of the high pressure vessel that houses various valves, pressure regulators, piping connectors, excess flow limiters, etc. for allowing the pressure vessel to be filled with the compressed hydrogen gas. The PRD may also be located at another opening in the pressure vessel, though the PRD generally is disposed at one or both ends of the pressure vessel. The PRD is useful when the pressure vessel is exposed to high temperatures. More than one PRD may be used where high temperatures might occur at a localized area apart from the location of the single PRD.

It is known that a localized heat source not adjacent an end of the pressure vessel with the PRD may not be detected by the PRD due to the low thermal conductivity of the composite materials forming the pressure vessel. A state of the art solution to this problem is to employ a heat pipe to transfer heat from the area of the pressure vessel adjacent the localized heat source. A heat pipe does not cover the entire surface of the pressure vessel, however. Other known designs use an additional insulating layer to reduce heat flux into the pressure vessel. The additional insulating layer only delays the rupture of the pressure vessel, however, and is therefore undesirable.

Pressure vessel systems with heat conducting layers for transferring heat from anywhere on the pressure vessel to the PRD are also described in U.S. Appn. Pub. No. 2008/0066805 to Winter et al., hereby incorporated herein by reference in its entirety. The known heat conducting layers include heat conducting mesh wrapped around and outside of the pressure vessel, and heat conducting strips connected to the PRD that extend along the pressure vessel. Heat conducting sheets, foils, and layers wrapped all around an outside of the pressure vessel are also known.

There is a continuing need for a pressure vessel that is effective in transporting heat from localized heat sources to the PRD, and facilitates the use of a single PRD instead of multiple PRDs. Desirably, the pressure vessel is provided with an additional protective layer that carries a portion of the load across the pressure vessel, militates against the need for an additional stone shield, and is more cost effective than present pressure vessel designs.

SUMMARY OF THE INVENTION

In concordance with the instant disclosure, a pressure vessel providing effective transportation of heat to a pressure relief device (PRD) from localized heat sources adjacent the pressure vessel, facilitating the use of a single PRD, providing an additional load-carrying protective layer, militating against the need for an additional stone shield, and being cost effective in comparison to known designs, is surprisingly discovered.

In one embodiment, a pressure vessel includes a composite layer having an outer surface and an inner surface. The inner surface defines an internal cavity therein for storage of a pressurized fluid. At least one pressure relief device is in fluid communication with the internal cavity. The at least one thermally conductive element is continuously wound on the outer surface of the composite layer and adapted to carry load and transport heat from a heat source adjacent the composite layer to the at least one pressure relief device.

In another embodiment, the thermally conductive element disposed on the outer surface of the composite layer is substantially solid.

In a further embodiment, a method for producing a pressure vessel includes the steps of: providing the composite layer having the outer surface and the inner su face, the inner surface defining the internal cavity therein for storage of the pressurized fluid; and winding the at least one thermally conductive element on the outer surface of the composite layer.

DRAWINGS

The above, as well as other advantages of the present disclosure, will become readily apparent to those skilled in the art from the following detailed description, particularly when considered in the light of the drawings described herein.

Figure 1:
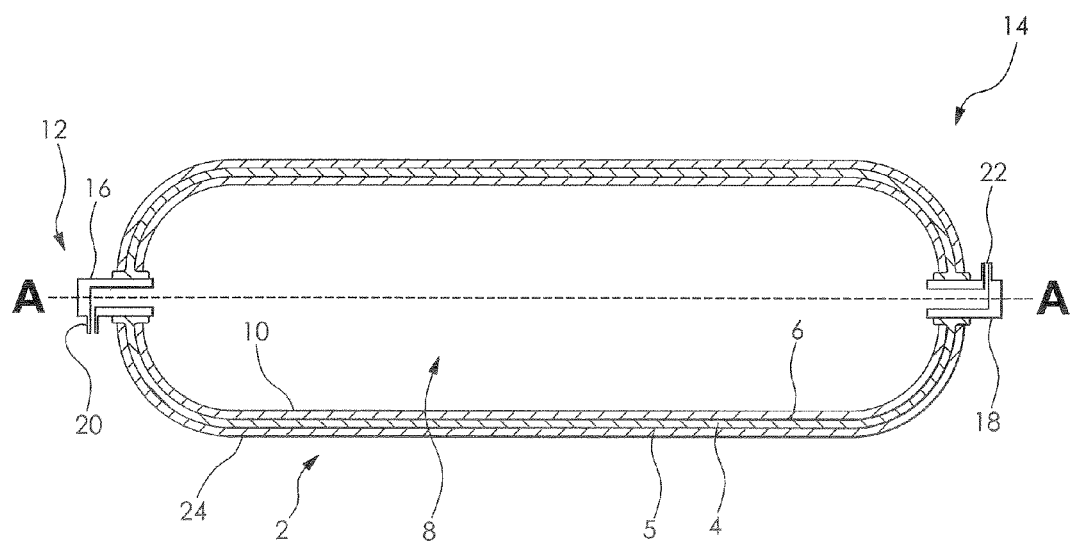
FIG. 1 is a side elevational cross-sectional view of a pressure vessel according to the present disclosure.
Figure 3:
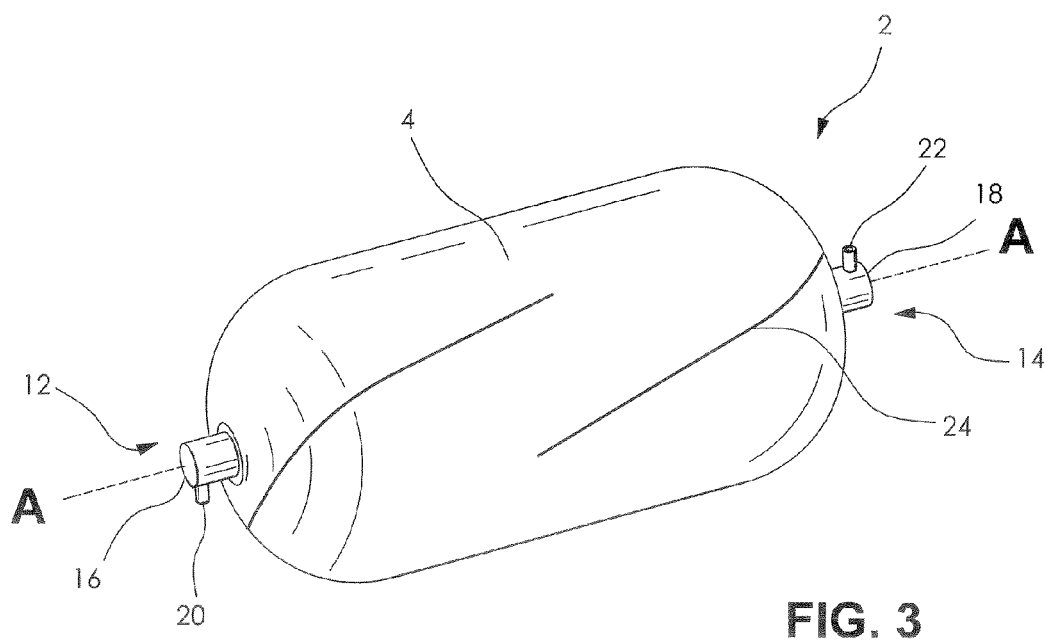
Figure 4:
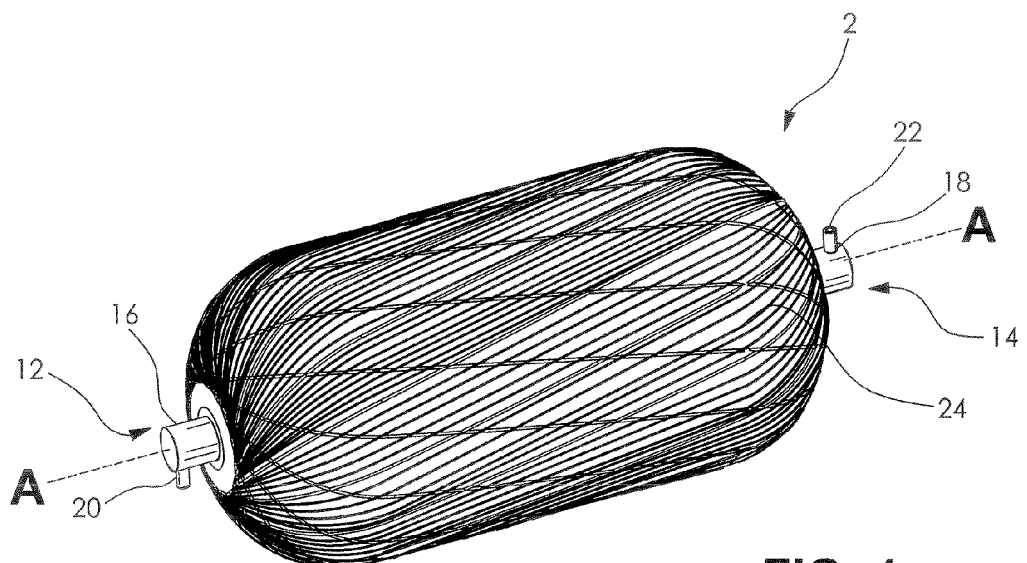

FIG. 3 is a perspective view of the pressure vessel depicted in FIG. 1, further showing a portion of a thermally conductive element disposed on the pressure vessel at an angle relative to a longitudinal axis of the pressure vessel; and FIG. 4 is a perspective view of the pressure vessel depicted in FIG. 3, further showing the pressure vessel substantially covered with the thermally conductive elements disposed at an angle relative to a longitudinal axis of the pressure vessel.

DETAILED DESCRIPTION OF THE INVENTION

The following description is merely exemplary in nature and is not intended to limit the present disclosure, application, or uses. It should also be understood that throughout the drawings, corresponding reference numerals indicate like or corresponding parts and features. In respect of the methods disclosed, the steps presented are exemplary in nature, and thus, are not necessary or critical.

FIG. 1 depicts a pressure vessel 2 according to one embodiment of the present invention. The pressure vessel 2 is a Type IV pressure vessel, although it should be understood that other pressure vessel constructions, types, and designs, such as Type III and Type V, may also be adapted according to the present disclosure. The pressure vessel 2 is generally cylindrical in shape to provide a desired integrity, although it should be appreciated that other shapes may also be used.

The pressure vessel 2 includes a composite layer 4 having an outer surface 5 and an inner surface 6. The inner surface 6 of the composite layer 4 defines an internal cavity 8 of the pressure vessel 2. Typically, the composite layer 4 is formed from a material having a sufficient thickness and mechanical rigidity to contain a pressurized fluid, such as pressurized hydrogen gas, in the pressure vessel 2. The composite layer 4 also provides a resistance to impact. The composite layer 4 is generally formed from a suitable composite material, such as a plastic composite, a glass composite, a carbon composite, and a combination thereof. One of skill in the art should appreciate that other materials can be chosen as desired. The composite material is generally wrapped to form the composite layer 4, for example, as is disclosed in co-pending U.S. application Ser. No. 11/677,781 to Schlag, hereby incorporated herein by reference in its entirety.

The pressure vessel 2 may include a liner 10 disposed adjacent to the composite layer 4. The liner 10 is a barrier that inhibits a permeation of the pressurized fluid from the internal cavity 8 of the pressure vessel 2. The liner 10 material is durable in the range of operating temperatures experienced by the pressure vessel 2 while in service. The liner 10 is typically thin to maintain a pressure vessel 2 that is lightweight. As a non-limiting example, the polymer liner 10 thickness is less than about 10 mm, and in particular embodiments less than about 5 mm. Other thicknesses may be used as desired. In a particular embodiment, the liner 10 is formed from a polymeric material such as a thermoplastic. Nonlimiting examples of thermoplastic materials suitable for the polymeric liner 10 include polyethylenes, nylons, polyvinyl chlorides, celluloses, vinyl chloride copolymers, polyimides, and combinations thereof. One suitable thermoplastic material includes high density polyethylene (HDPE). One of skill in the art should appreciate that other polymeric materials may be used.

The pressure vessel 2 has a first end 12 and a second end 14. A first boss 16 is disposed at the first end 12 of the pressure vessel 2 and forms a passage through the composite layer 4. The passage is in communication with the vessel cavity 8. The first boss 16 is typically a structure that houses various components, including adapters, valves, pressure regulators, piping connectors, excess flow limiters, etc. These additional components allow the pressure vessel 2 to be charged with the pressurized fluid, such as hydrogen gas, and allow the pressurized fluid to be discharged from the pressure vessel 2 to a fuel cell system. A suitable adhesive, sealing ring, or the like is also employed to seal the first boss 16 to the pressure vessel 2 for retention of the pressurized fluid. The adhesive, sealing ring, or the like secures the boss 16 to the composite layer 4. In particular embodiments, a substantially similar second boss 18 is disposed at the second end 14 of the pressure vessel 2.

The first boss 16 includes a first pressure relief device (PRD) 20. The first PRD 20 is typically in communication with the vessel cavity 8 and opens to vent the pressurized fluid at a controlled rate through a PRD vent conduit (not shown). In particular, the first PRD 20 is thermally activated in the event of an exposure to a predetermined temperature. As a nonlimiting example, the PRD 20 may activate upon reaching a temperature greater than about 120° C. In some embodiments, the PRD 20 includes a mechanism involving a solder (not shown) that melts at a desired or critical temperature. In another embodiment, the PRD 20 includes a glass container filled with fluid (not shown) which bursts at the aforementioned temperature. The melting of the solder or breaking of the fluid-filled glass container causes the first PRD 20 to open, thus venting the contents of the pressure vessel cavity 8. The second end 14 of the pressure vessel 2 may include a substantially similar second PRD 22. It should be understood that other PRD devices that vent the contents of the pressure vessel 2 upon attainment of a desired temperature or a desired internal pressure are also suitable.

The pressure vessel 2 of the present disclosure includes a thermally conductive element 24. The thermally conductive element 24 is disposed on the outer surface 5 of the composite layer 4. The thermally conductive element 24 may be wound on the outer surface 5, for example. As used herein, wound is meant to include linear application such as substantially parallel to the longitudinal axis A of the pressure vessel 2. The thermally conductive element 24 is adapted to transport heat from a heat source adjacent the composite layer 4 to at least one of the first PRD 20 and the second PRD 22. The heat source may be localized along a length of the pressure vessel 2 between the first end 12 and the second end 14. It should be understood that the thermally conductive element 24 is employed to activate at least one of the first PRD 20 and the second PRD 22 when the localized heating of the pressure vessel 2 occurs.

One of ordinary skill in the art should appreciate that the thermally conductive element 24 may be formed from any suitable material having a thermal conductivity greater than that exhibited by the composite layer 4. Typically, the thermally conductive element 24 is substantially solid, as opposed to a pipe or like hollow element. In one embodiment, the thermal conductivity of the thermally conductive element 24 is greater than about 5 W/m-K, in a particular embodiment greater than about 50 W/m-K, and in a most particular embodiment greater than about 100 W/m-K. As nonlimiting examples, the thermally conductive element 24 may be a wire formed from one of aluminum, copper, gold, silver, steel, titanium, zinc, and an alloy of one or more thereof. A unitary wire filament or a wire cord having more than one filament may be employed as desired. Other materials having a suitable thermal conductivity may also be employed.

Figure 2:
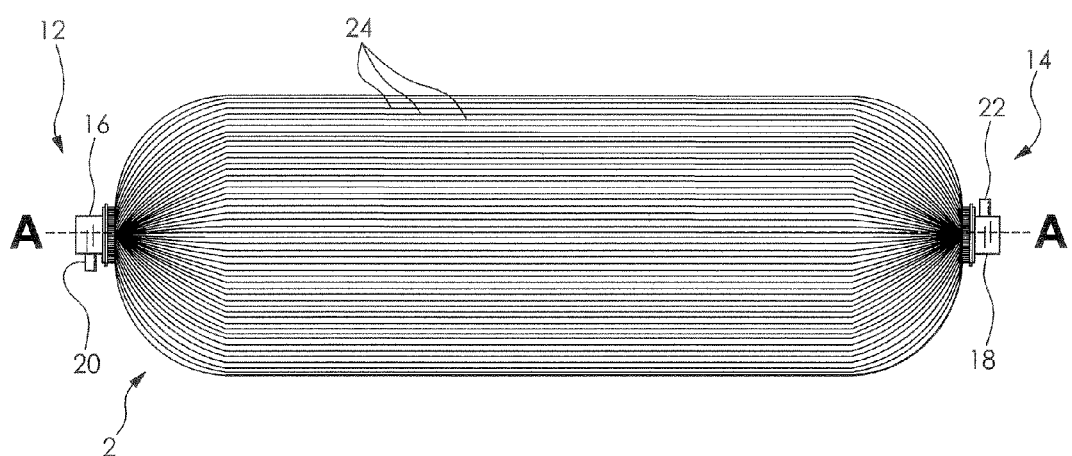
FIG. 2 is a side elevational view of the pressure vessel depicted in FIG. 1, further showing an array of thermally conductive elements disposed on the surface of the pressure vessel generally parallel with a longitudinal axis of the pressure vessel.

The thermally conductive element 24 is generally disposed along a length of the composite layer 4 on the sides of the pressure vessel 2 from the first end 12 to the second end 14. To optimize the transport of heat to at least one of the PRDs 22, 24, the thermally conductive element 24 is further disposed adjacent at least one of the bosses 16, 18. In particular embodiments, the thermally conductive element 24 contacts at least one of the bosses 16, 18. In another embodiment, the thermally conductive element 24 contacts at least one of the PRDs 22, 24. As shown in FIG. 2, the at least one thermally conductive element 24 may include a plurality of thermally conductive elements 24 disposed generally parallel to a longitudinal axis A of the pressure vessel 2.

In one embodiment shown in FIGS. 3 and 4, the thermally conductive element 24 is disposed on the composite layer 4 at an angle generally relative to the longitudinal axis A of the pressure vessel 2. As a nonlimiting example, the thermally conductive element 24 may be wound on the composite layer 4 to provide a generally helical pattern. The winding may include wrapping the thermally conductive element 24 along the sides of the pressure vessel 2 and around the first end 12 and the second end 14 of the pressure vessel 2. The lengthwise passes of the thermally conductive elements 24 are desirably applied side-by-side and substantially cover the composite layer 4 with the thermally conductive element 24. A plurality of the thermally conductive elements 24 or a single thermally conductive element 24 may be employed to substantially cover the composite layer 4. In a particular embodiment, the single thermally conductive element 24 is continuously wound on the pressure vessel 2 to substantially cover the composite layer 4. When more than one thermally conductive elements 24 is applied from one end of the pressure vessel 2 to another, the ends of the individual elements 24 may be connected to one another to form continuously wound thermally conductive elements 24 that allow the strips to carry a load of the pressure vessel 2. Other suitable winding patterns also include circumferential or hoop wrapping of the composite layer 4 with the thermally conductive element 24 at an angle substantially perpendicular to the longitudinal axis of the pressure vessel 2. It should be appreciated that alternative winding patterns and combinations thereof can also be used as desired.

It should be appreciated that when the pressure vessel 2 is substantially cylindrical in shape, an angle α of the thermally conductive element 24 disposed along the sides of the pressure vessel 2 may be substantially constant. The desirable angle α may be selected by finite element analysis, for example. The finite element analysis may take into account an application of the thermally conductive element 24 with or without friction, as desired. The angle α can also be estimated by the Law of Clairault, assuming minimal friction when the thermally conductive element 24 is applied to the pressure vessel 2. The estimate under the Law of Clairault may be employed as part of the finite element analysis to yield the final desired angle α of the thermally conductive element 24 to be applied. The desirable angle α maybe calculated to provide for optimum load-carrying efficiency for a given outer diameter of the pressure vessel 2.

As the thermally conductive element 24 approaches one of the first and second ends 12, 14, the angle diverts from α and increases up to about ninety degrees (90°) relative to the longitudinal axis A near one of the first and second bosses 16, 18. The angle increases continuously in the dome at the ends 12, 14 of the pressure vessel 2 until it reaches a turning point at the angle of ninety degrees (90°) and continues back towards the sides of the pressure vessel 2. The angle returns to α upon moving to the sides of the cylindrical pressure vessel 2. The angle of the thermally conductive element 24 may also form crossing point contacts with underlying composite strips of the composite layer 4 that have been applied at a different angle relative the longitudinal axis A. The crossing point contacts may facilitate the transport of heat from the localized heat source to one of the PRDs 22, 24.

The thermally conductive element 24 may further have a coating adapted to optimize the thermal conductivity of the thermally conductive element 24. The coating may be a thermally conductive metal, for example. As a nonlimiting example, the thermally conductive element 24 may be a steel wire (about 50 W/m-K) coated with another, more thermally conductive metal such as silver (about 400 W/m-K). It should be understood that such a design may be cost effective and provide a desired level of thermal conductivity than may be available with the uncoated wire alone. Other coatings having the desired thermal conductivity may also be employed.

The thermally conductive element 24 may further be formed within a thermally conductive layer, such as a thermally conductive polymer layer, as desired.

The pressure vessel 2 may further include an insulating layer (not shown) disposed between the thermally conductive element 24 and the composite layer 4. The insulating layer is adapted to militate against a transfer of heat from the localized heat source to the composite layer 4 and the pressurized fluid within the internal cavity 8. Suitable materials for the insulating layer may be selected as desired.

The present disclosure further includes a method for producing the pressure vessel 2. The method first includes the step of providing the composite layer 4 having the outer surface 5 and an inner surface 6, the inner surface 6 defining the internal cavity 8 therein for storage of the pressurized fluid. The at least one thermally conductive element 24 is then wound on the composite layer 4 as described herein.

The step of winding the thermally conductive element 24 on the outer surface of the composite layer 4 may further include the step of forming a helical pattern with the thermally conductive element 4 on the outer surface 5 of the composite layer 4. The helical pattern may be formed by wrapping the thermally conductive element 24 at an angle generally relative to a longitudinal axis A of the pressure vessel 2. Discrete strips of the thermally conductive element 24 may be placed on the composite layer 4 and later joined to form a continuous thermally conductive element 24. In a particular embodiment, a single thermally conductive element 24 may be continuously wound on the composite layer 4 until the outer surface 5 is substantially covered. The outer surface 5 of the composite layer 4 may also be wrapped with the insulating layer prior to the step of winding the at least one thermally conductive element 24 onto the composite layer 4.

The employment of the thermally conductive element 24 allows for the heat of a localized heat source to be transported to one of the first and second PRDs 20, 22 in a period of time lower than observed with conventional composite pressure vessels. Additionally, the thermally conductive element 24 allows for a simplification of the pressure vessel 2 design by enabling the use of a single PRD 20 in place of the conventional first and second PRDs 20, 22 at opposite ends 12, 14 of the pressure vessel 2. In a pressure vessel 2 according to the present disclosure, even the localized heat source at an end of the pressure vessel 2 opposite the end where the single PRD 20 is disposed is effective in activating the PRD 20. The thermally conductive element 24 therefore minimizes the pressure vessel 2 design complexity and is a more cost effective approach in comparison to known pressure vessel designs.

As opposed to known designs such as heat conducting meshes and strips wrapped on the pressure vessel 2, the thermally conductive element 24 when continuously wound around the pressure vessel 2 has the additional function of carrying at least part of the load of the pressure vessel 2. It should be appreciated that the continuously wound thermally conductive element 24 when wrapped around the ends 12, 14 of the pressure vessel 2 can provide a particular load-carrying advantage in comparison to known meshes and discrete strips merely disposed along the sides of the pressure vessel 2.

The modulus and tensile strength of the thermally conductive element 24 may be substantially the same as, or greater than, the modulus and tensile strength of the composite material. It should be appreciated that a portion of the composite layer 4 may be replaced with the load-carrying thermally conductive element 24 to optimize a cost of the pressure vessel 2, such as when the thermally conductive element 24 is a metal such as steel and the composite layer 4 includes carbon fiber. Suitable dimensions and configurations of the thermally conductive element 24 for maximizing heat transport to at least one of the PRDs 20, 22, and providing an appropriate load-carrying capacity, may be selected as desired.

It is surprisingly found that the thermally conductive element 24 also provides a stone shield function. Small stones, for example, may be accelerated by tires and thrown against the pressure vessel 2 during an operation of a vehicle having the pressure vessel 2. A stone shield covering the pressure vessel 2 has been typically used for this reason. The employment of the thermally conductive element 24 may eliminate the need for a separate and distinct stone shield. The use of the thermally conductive element may therefore optimize a mass and a volume of the pressure vessel 2.

While certain representative embodiments and details have been shown for purposes of illustrating the invention, it will be apparent to those skilled in the art that various changes may be made without departing from the scope of the disclosure, which is further described in the following appended claims.

What is claimed is:

1. A pressure vessel, comprising:
   a composite layer having an outer surface and an inner surface, the inner surface defining an internal cavity therein for storage of a pressurized fluid;
   at least one pressure relief device in fluid communication with the internal cavity; and
   at least one thermally conductive element continuously wound on the outer surface of the composite layer and adapted to carry a load and transport heat from a heat source adjacent the composite layer to the at least one pressure relief device, wherein the at least one thermally conductive element is a wire.

2. The pressure vessel of claim 1, wherein the wire is formed from one of aluminum, copper, gold, silver, steel, titanium, zinc, and alloys thereof.

3. The pressure vessel of claim 1, further including a boss disposed in the composite layer at an end of the pressure vessel and having the pressure relief device formed therein.

4. The pressure vessel of claim 3, wherein the thermally conductive element is disposed adjacent the boss.

5. The pressure vessel of claim 1, wherein the thermally conductive element contacts the pressure relief device.

6. The pressure vessel of claim 1, wherein the thermally conductive element is disposed along a length of the composite layer from a first end to a second end of the pressure vessel.

7. The pressure vessel of claim 1, wherein the thermally conductive element is disposed generally parallel to a longitudinal axis of the pressure vessel.

8. The pressure vessel of claim 1, wherein the thermally conductive element is disposed at an angle relative to a longitudinal axis of the pressure vessel.

9. The pressure vessel of claim 8, wherein the angle is substantially constant between the ends of the pressure vessel.

10. The pressure vessel of claim 1, wherein the thermally conductive element substantially covers the outer surface of the composite layer.

11. The pressure vessel of claim 1, wherein the thermally conductive element has a coating adapted to maximize the thermal conductivity thereof.

12. The pressure vessel of claim 1, further including an insulating layer disposed between the thermally conductive element and the composite layer.

13. The pressure vessel of claim 1, wherein the thermally conductive element is formed within a thermally conductive layer.

14. The pressure vessel of claim 1, wherein the at least one thermally conductive element is a plurality of thermally conductive elements continuously wound on the outer surface of the composite layer.

15. The pressure vessel of claim 1, the composite layer formed from at least one composite strip wrapped around the internal cavity, the thermally conductive element forming crossing contact points for thermal transfer with the composite strip.

16. A pressure vessel, comprising:
   a composite layer having an outer surface and an inner surface, the inner surface defining an internal cavity therein for storage of a pressurized fluid;
   at least one pressure relief device in fluid communication with the internal cavity; and
   at least one substantially solid, thermally conductive element continuously wound on the outer surface of the composite layer and adapted to catty a load and transport heat from a heat source adjacent the composite layer to the at least one pressure relief device, wherein the at least one thermally conductive element is a wire.

* * * * *